United States Patent
Chun et al.

(10) Patent No.: US 10,387,333 B2
(45) Date of Patent: Aug. 20, 2019

(54) NON-VOLATILE RANDOM ACCESS MEMORY WITH GATED SECURITY ACCESS

(71) Applicant: QUALCOMM INCORPORATED, San Diego, CA (US)

(72) Inventors: Dexter Chun, San Diego, CA (US); Yanru Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 266 days.

(21) Appl. No.: 15/399,625

(22) Filed: Jan. 5, 2017

(65) Prior Publication Data

US 2018/0189195 A1    Jul. 5, 2018

(51) Int. Cl.
*G06F 21/79*    (2013.01)
*G06F 12/14*    (2006.01)
*G06F 21/60*    (2013.01)

(52) U.S. Cl.
CPC ........ *G06F 12/1425* (2013.01); *G06F 21/602* (2013.01); *G06F 21/79* (2013.01); *G06F 2212/1052* (2013.01)

(58) Field of Classification Search
None
See application file for complete search history.

(56) References Cited

U.S. PATENT DOCUMENTS

| 5,774,545 | A  | * | 6/1998  | Raghavachari .. G01R 31/31719 713/189 |
| 6,880,091 | B1 | * | 4/2005  | Mattis ..................... G06F 21/31 713/194 |
| 7,657,722 | B1 |   | 2/2010  | De Angel et al. |
| 8,560,845 | B2 |   | 10/2013 | Krstić et al. |
| 9,612,977 | B2 | * | 4/2017  | Berenbaum ......... G06F 12/1408 |
| 9,720,700 | B1 | * | 8/2017  | Brown .................. H04L 9/0891 |
| 2002/0040423 | A1 | * | 4/2002 | Okaue ................. G06F 12/1433 711/163 |
| 2002/0069315 | A1 | * | 6/2002 | Okaue ..................... G06F 21/79 711/103 |
| 2003/0037237 | A1 | * | 2/2003 | Abgrall .................. G06F 21/53 713/166 |
| 2003/0079099 | A1 |   | 4/2003 | Kawamata |
| 2003/0212871 | A1 |   | 11/2003 | Suzuki et al. |
| 2004/0158711 | A1 | * | 8/2004 | Zimmer .................. G06F 21/57 713/165 |
| 2005/0005131 | A1 | * | 1/2005 | Yoshida .................. G06F 21/31 713/183 |

(Continued)

OTHER PUBLICATIONS

International Search Report and Written Opinion—PCT/US2017/058803—ISA/EPO—dated Jan. 26, 2018.

*Primary Examiner* — Malcolm Cribbs
(74) *Attorney, Agent, or Firm* — Smith Tempel Blaha LLC

(57) ABSTRACT

Systems and methods are disclosed for providing secure access to a non-volatile random access memory. One such method comprises sending an unlock password to a non-volatile random access memory (NVRAM) in response to a trusted boot program executing on a system on chip (SoC). The NVRAM compares the unlock password to a pass gate value provisioned in the NVRAM. If the unlock password matches the pass gate value, a pass gate is unlocked to enable the SoC to access a non-volatile cell array in the NVRAM.

30 Claims, 7 Drawing Sheets

(56) References Cited

U.S. PATENT DOCUMENTS

| | | | |
|---|---|---|---|
| 2006/0036872 A1* | 2/2006 | Yen | G06F 21/79 |
| | | | 713/183 |
| 2008/0189557 A1 | 8/2008 | Pipitone et al. | |
| 2009/0033464 A1 | 2/2009 | Friedrich | |
| 2009/0164744 A1 | 6/2009 | Norman | |
| 2010/0082968 A1* | 4/2010 | Beverly | G06F 12/1433 |
| | | | 713/2 |
| 2011/0307711 A1* | 12/2011 | Novak | G06F 21/575 |
| | | | 713/188 |
| 2012/0159041 A1* | 6/2012 | Saxena | G06F 21/79 |
| | | | 711/103 |
| 2012/0166715 A1* | 6/2012 | Frost | G06F 11/1068 |
| | | | 711/103 |
| 2013/0086385 A1 | 4/2013 | Poeluev | |
| 2015/0186663 A1* | 7/2015 | Schmidt | G06F 21/62 |
| | | | 345/173 |
| 2015/0242158 A1* | 8/2015 | Hung | G06F 3/0688 |
| | | | 711/103 |
| 2017/0060782 A1* | 3/2017 | Chinnakkonda Vidyapoornachary | G06F 21/88 |

* cited by examiner

| STEP | OPERATION | SoC knows | SoC not know | NVRAM know | NVRAM not know | snooper know | snooper not know |
|---|---|---|---|---|---|---|---|
| 502 | public key modulus (variable) | $p = 16$ | | $p = 16$ | | $p = 16$ | |
| 504 | public key base (variable) | $g = 5$ | | $g = 5$ | | $g = 5$ | |
| 506 | private key exponent fused | $a = 6$ | b | $b = 7$ | a | | a, b |
| 508 | compute hash | $A = g^a \bmod p$ | | $B = g^b \bmod p$ | | | |
| 510 | compute hash | $A = 5^6 \bmod 16 = 9$ | | $B = 5^7 \bmod 16 = 13$ | | | |
| 512 | share hash | $A = 9, B = 13$ | | $A = 9, B = 13$ | | $A = 9, B = 13$ | a, b |
| 514 | compute secret key | $s = B^a \bmod p$ | | $s = A^b \bmod p$ | | | a, b, s |
| 516 | compute secret key | $s = 13^6 \bmod 16 = 9$ | | $s = 9^7 \bmod 16 = 9$ | | | a, b, s |
| 518 | SoC send password within encrypted message (U) protected with secret key (s) | $U = s \{password\}$ | | | | U | a, b, s |
| 520 | NVRAM decrypts password using secret key (s) | | | $password = s^{-1} \{U\}$ | | U | a, b, s, password |
| 522 | pass gate is unlocked if password sent by SoC matches value stored in NVRAM fuse | | | password match | | U | a, b, s, password |

*FIG. 5*

NON-VOLATILE RANDOM ACCESS MEMORY WITH GATED SECURITY ACCESS

DESCRIPTION OF THE RELATED ART

Portable computing devices (e.g., cellular telephones, smart phones, tablet computers, portable digital assistants (PDAs), portable game consoles, wearable devices, and other battery-powered devices) and other computing devices continue to offer an ever-expanding array of features and services, and provide users with unprecedented levels of access to information, resources, and communications. To keep pace with these service enhancements, such devices have become more powerful and more complex. Portable computing devices now commonly include a system on chip (SoC) comprising a plurality of memory clients embedded on a single substrate (e.g., one or more central processing units (CPUs), a graphics processing unit (GPU), digital signal processors, etc.). The memory clients may read data from and store data in an external system memory (i.e., random access memory (RAM)) electrically coupled to the SoC via a high-speed bus.

Due to its relatively low cost and high capacity, volatile memory (e.g., dynamic RAM (DRAM) and static RAM (SRAM)) are widely used for external system memory in digital electronics, such as, portable computing devices. Despite these advantages, volatile memory devices consume relatively more power than non-volatile memory devices because the memory cells lose their contents after power is removed and, therefore, must be periodically refreshed. As non-volatile memory becomes more cost-effective, it may become a more viable solution for use as system memory in computing devices. Non-volatile RAM (NVRAM) contains non-volatile memory cells that (unlike DRAM and SRAM) retain their data after power is shut-off. While this may improve power efficiency, the data contained in NVRAM may be susceptible to unauthorized reading and/or writing.

For security and privacy purposes, some of the contents contained in the NV cells may be required to be tamper-proof. To provide this capability, existing solutions may employ encryption to ensure that the contents of the NV cells cannot be read and altered. All data read/written by a memory client is first de-encrypted/encrypted and then stored in the NV cells. However, de-encryption/encryption introduces latency into the read/write data path, which can reduce performance for upstream memory clients.

Another solution to the privacy/security concerns associated with NVRAM is to overwrite/erase the content of NVRAM upon power-down. The problem with this approach is that power is required to write the NVRAM and a bad power-down may not entirely complete the operation. Also, it may be advantageous to keep NVRAM contents intact so that the next device boot can benefit in speed from the non-volatile retention of content.

Accordingly, there is a need for improved systems and methods for providing secure access to NVRAM.

SUMMARY OF THE DISCLOSURE

Systems and methods are disclosed for providing secure access to a non-volatile random access memory. One such method comprises sending an unlock password to a non-volatile random access memory (NVRAM) in response to a trusted boot program executing on a system on chip (SoC). The NVRAM compares the unlock password to a pass gate value provisioned in the NVRAM. If the unlock password matches the pass gate value, a pass gate is unlocked to enable the SoC to access a non-volatile cell array in the NVRAM.

An embodiment of a system comprises a system on chip (SoC) and a NVRAM. The SoC comprises a random access memory (RAM) controller electrically coupled to the NVRAM. The NVRAM comprises a non-volatile cell array; a NVRAM fuse comprising a pass gate value, and a pass gate configured to prevent read/write access to the non-volatile cell array if an unlock password received from the RAM controller does not match the pass gate value.

Another embodiment is a non-volatile random access memory device comprising a non-volatile cell array, a fuse comprising a pass gate value, and a pass gate configured to prevent read/write access to the non-volatile cell array if a received unlock password does not match the pass gate value.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

FIG. 5 is a table illustrating an exemplary method of an encrypted password exchange between the SoC and the NVRAM of FIGS. 1, 2, and 4.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone", "wireless communication device," and "wireless handset" are used interchangeably. With the advent of third generation ("3G") wireless technology and four generation ("4G"), greater bandwidth availability has enabled more portable computing devices with a greater variety of wireless capabilities. Therefore, a portable computing device may include a cellular telephone, a pager, a PDA, a smartphone, a navigation device, or a hand-held computer with a wireless connection or link.

Figure 1:
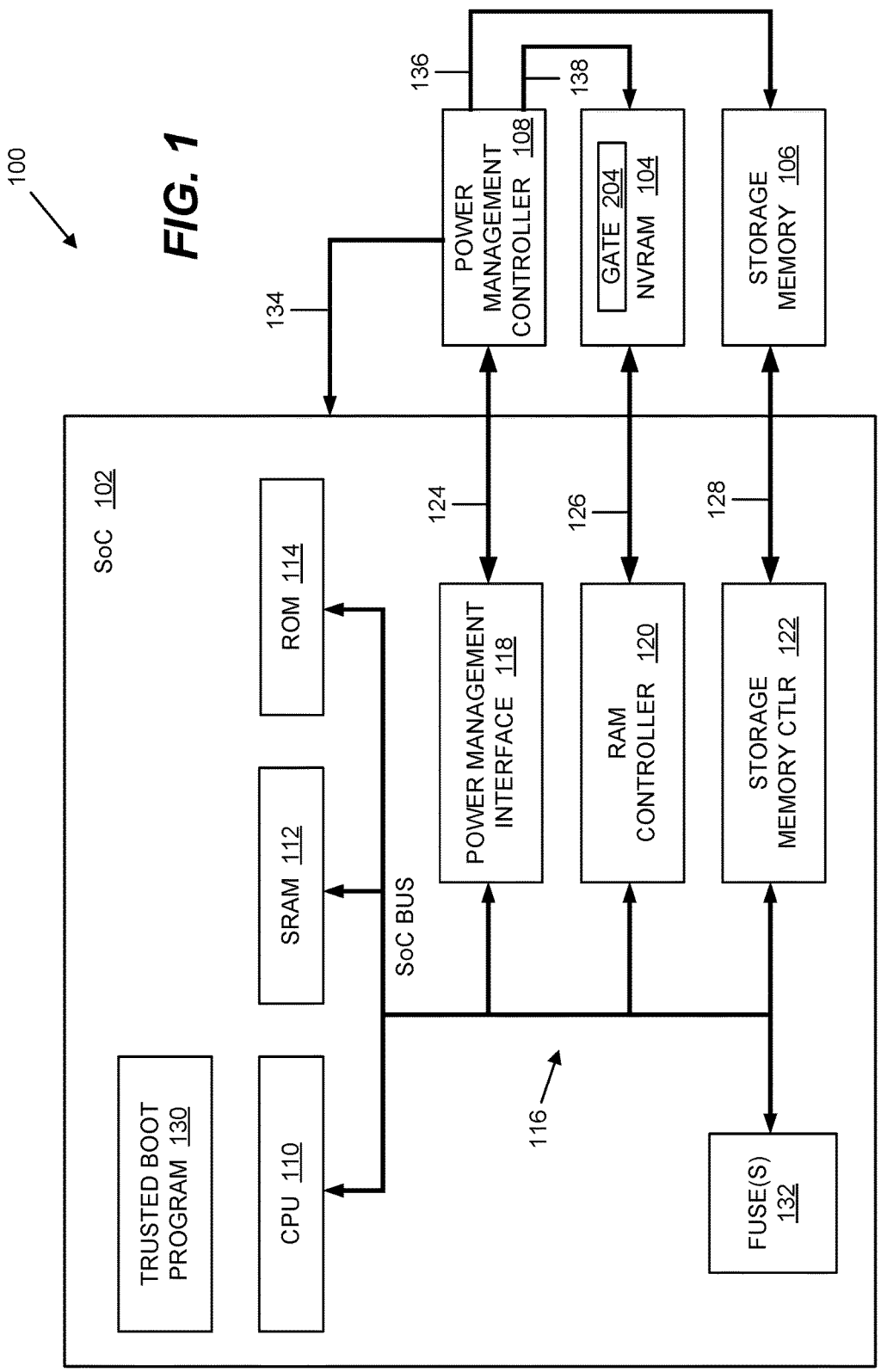
FIG. 1 is a block diagram of an embodiment of a system for providing secure access to a non-volatile random access memory (NVRAM).

FIG. 1 illustrates an embodiment of a system 100 for providing secure access to a non-volatile random access memory (NVRAM). The system 100 comprises a system on chip (SoC) 102 electrically coupled to a tamper/snoop-resistant NVRAM 104 via a high-speed bus 126. NVRAM 104 may comprise any desirable type of non-volatile memory that retains NV cell content when power is removed (e.g., spin-transfer torque magnetic random-access memory (STT-RAM), phase-change RAM (PC-RAM), resistive RAM (RE-RAM), etc.). As described below in more detail in connection with FIGS. 2-6, NVRAM 104 comprises a gate mechanism 204 that generally includes functionality for preventing read/write operations from accessing a NV cell array 202 unless a successful authentication or password exchange occurs between the SoC 102 and the NVRAM 104.

It should be appreciated that system 100 may be implemented in any computing device, including a personal computer, a workstation, a server, a portable computing device (PCD), such as a cellular telephone, a smartphone, a portable digital assistant (PDA), a portable game console, a navigation device, a tablet computer, a wearable device, such as a sports watch, a fitness tracking device, etc., or other battery-powered, web-enabled devices.

The SoC 102 comprises various on-chip components, including a central processing unit (CPU) 110, a static random access memory (SRAM) 112, read only memory (ROM) 114, a RAM controller 120, a storage memory controller 122, a power management interface 118, and fuses 132 electrically coupled via SoC bus 116. RAM controller 120, which is electrically coupled to NVRAM 104 via high-speed bus 126, controls communications with NVRAM 104. Storage memory controller 122, which is electrically coupled to external storage memory 106 via bus 128, controls communication with storage memory 106. Power management interface 118 is electrically coupled to a power manager controller 108 via a connection 124. Power manager controller 108 controls the power supplied to various system components. As illustrated in FIG. 1, power is supplied to SoC 102, NVRAM 104, and storage memory 106 via connections 134, 138, and 136, respectively. System 100 further comprises a power source (e.g., a battery), which is not shown.

Figure 2:
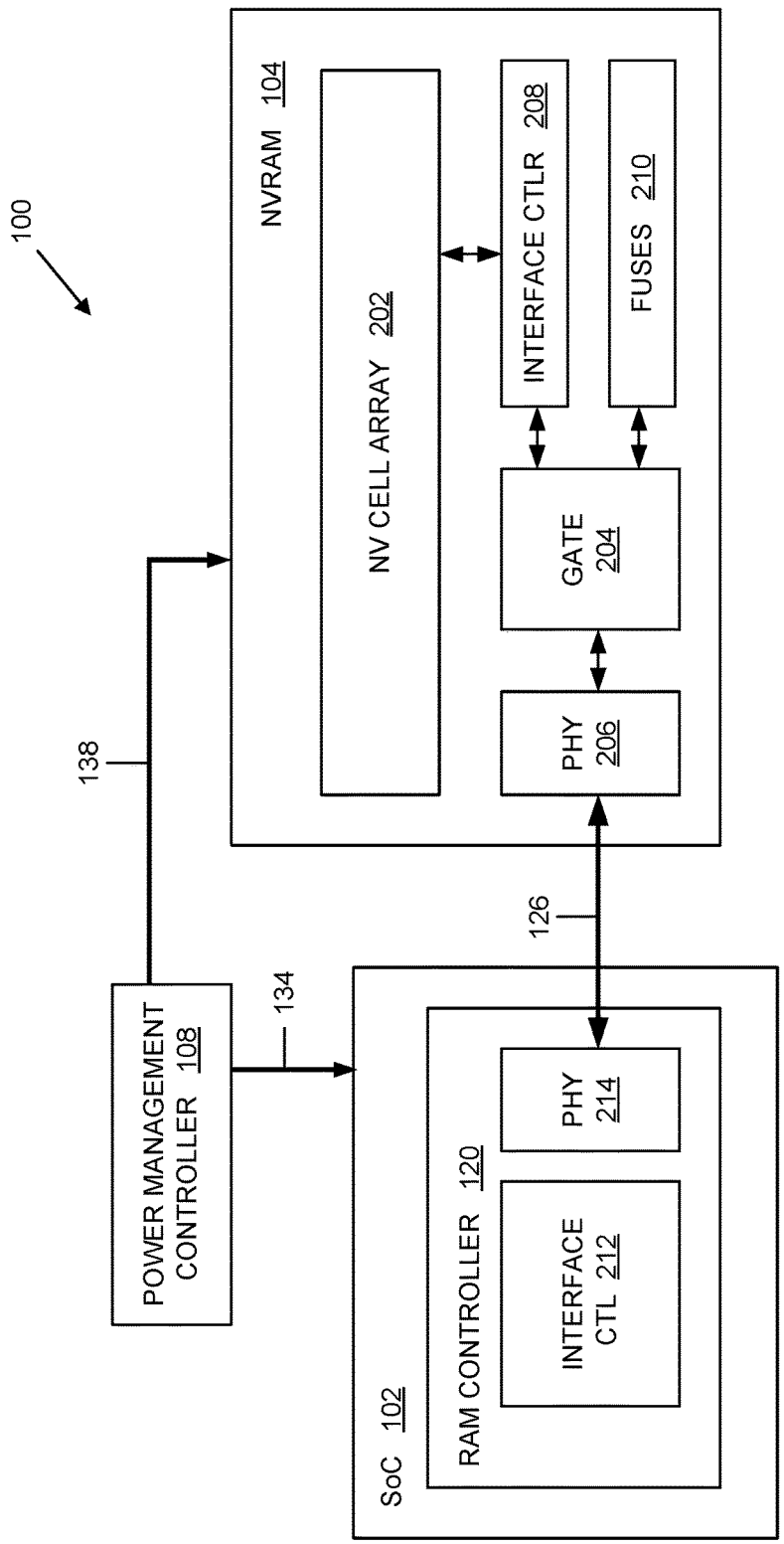
FIG. 2 is a block diagram illustrating an embodiment of the NVRAM in FIG. 1

As illustrated in FIGS. 1 & 2, the SoC 102 comprises fuse(s) 132 that are securely paired with fuse(s) 210 residing in NVRAM 104. The SoC fuse(s) 132 and the NVRAM fuse(s) 210 are provisioned with data, values, passwords, private/public keys associated with encryption/decryption algorithm(s), etc. for implementing a secure password exchange between the SoC 102 and NVRAM 104. When powered down and upon boot-up, the gate mechanism 204 in NVRAM 104 is configured in a "locked" state that prevents read/write operations from accessing NV cell array 202. When the system 100 is booted up, a trusted boot program 130 begins executing on the CPU 110. The trusted boot program may be initially stored on the SoC 102 in ROM 114 or it may be stored externally (e.g., retrieved from storage memory 106 or from peripherals such as USB 342 or network card 388). It should be appreciated that a secure and trusted boot program that is authenticated during the boot process may be allowed to perform the secure unlocking actions. The authenticity of the trusted boot program 130 may be determined (pass or fail) by an SoC on-chip authentication scheme, which is typically implemented using immutable hardware and read-only memory (ROM) within the SoC 102. These or other steps may confirm the authenticity of the program that unlocks the NVRAM 104 so that system security is not compromised by an intruder. Failure of authentication may stop the program from advancing, resulting in the NVRAM 104 remaining locked. Upon successful verification of its legitimacy, the trusted boot program 130 (or other secure software) may proceed with the unlock procedure by fetching secure password exchange data stored in fuse(s) 132 on SoC 102. Based on the raw security data stored in fuse(s) 132 (or data calculated therefrom using private and/or public keys, encryption algorithm(s), etc.), an unlock password may be provided to RAM controller 120 and sent to NVRAM 104 via bus 126.

As illustrated in FIG. 2, RAM controller 120 comprises an interface controller 212 and a physical layer 214. Interface controller 212 reformats the data to/from clients of SoC 102 (e.g., CPU 110, a GPU, a DSP, etc.) into a packet and/or bus protocol compatible with the NVRAM device 104. Reformatting may include the data segmentation/reassembly, physical address realignment, link error handling, and the generation of control and address signals that may be driven/received by the physical layer 214 via the bus 126. Physical layer 214 provides the SoC's external electrical interface and physical connections of high-speed bus 126 to a corresponding physical layer 206 in NVRAM 104. Physical layer 206 in NVRAM 104 is electrically coupled to the gate mechanism 204. In response to receiving the unlock password from the SoC 102, the NVRAM 104 compares the received unlock password to a pass gate value provisioned in fuse(s) 210. Fuse(s) 210 may leverage existing fuse functionality in NVRAM devices. For example, fuse(s) 210 may be implemented using the fuse functionality conventionally used in memory devices for the repair of failed row replacement (e.g., additional row(s) for storing pass gate value(s)). In an embodiment, the fuse(s) 210 may comprise a programmable memory cell. It should be appreciated, however, that the pass gate value may be hardcoded in NVRAM 104. In an embodiment, the pass gate value may be hardcoded into a memory device using, for example, logic circuit(s), state machines, a read only memory, metal traces, etc. If the unlock password received from the SoC 102 matches the pass gate value, the gate mechanism 204 may be changed from the "locked state" (in which read/write operations are disabled) to an "unlocked state" in which the SoC 102 is able to perform read/write operations to the NV cell array 202. If the unlock password received from the SoC 102 does not match the pass gate value, the gate mechanism 204 may be maintained in the "locked state" with read/write operations disabled. If repeated unlock attempts fail, the gate mechanism 204 may permanently disable the NVRAM 104 when a self-destruct counter exceeds a threshold.

Figure 3:
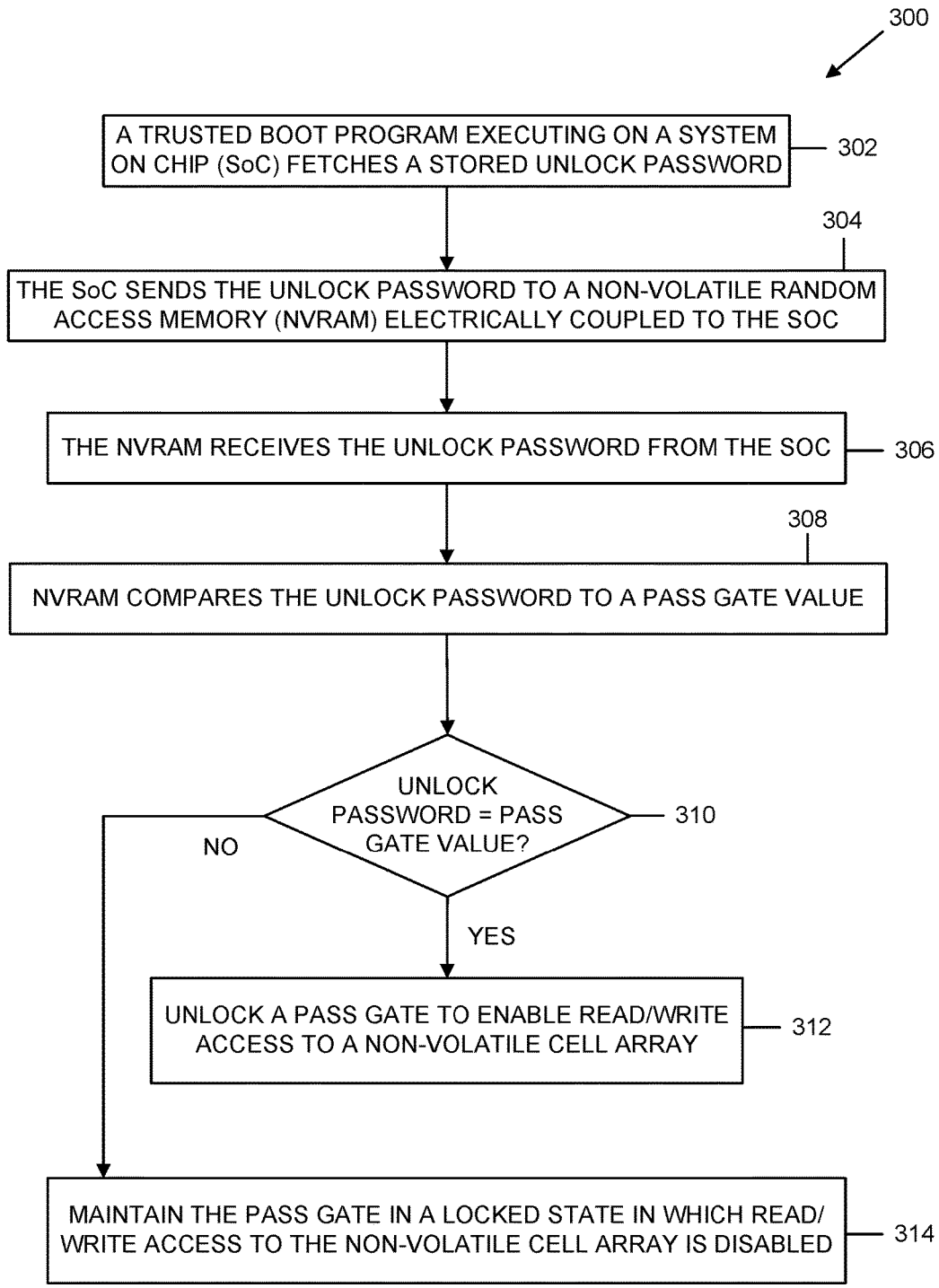
FIG. 3 is a flowchart illustrating an embodiment of a method for providing secure access to the NVRAM in FIGS. 1 and 2.

FIG. 3 illustrates an embodiment of a method 300 for providing secure access to NVRAM 104 via the gate mechanism 204, the SoC fuse(s) 210, and the NVRAM fuse(s) 132. At block 302, the system 100 is booted up and the trusted boot program 130 begins executing on the CPU 102. The trusted boot program 130 initiates a fetch of the unlock password stored in fuse(s) 210 on the SoC 102. At block 304, the unlock password is sent to NVRAM 104 by RAM controller 120 via bus 126. In an embodiment, the unlock password may be sent either unencrypted or encrypted. Encryption may be performed within the SoC 102. It may be encrypted programmatically by software running on the CPU 110, or it may be encrypted in dedicated encryption hardware (not shown). At block 306, NVRAM 104 receives the unlock password at physical layer 206. If the unlock password was encrypted by the SoC 102, it must first be decrypted by the hardware gate logic 404. At block 308, NVRAM compares the unencrypted unlock password to a pass gate value stored in fuse(s) 210. At decision block 310, the pass gate mechanism 204 is unlocked if the unlock password matches the pass gate value. If the unlock password does not match the pass gate value, the pass gate mechanism 204 may be maintained in the locked state to prevent read/write access to the NV cell array 202.

Figure 4:
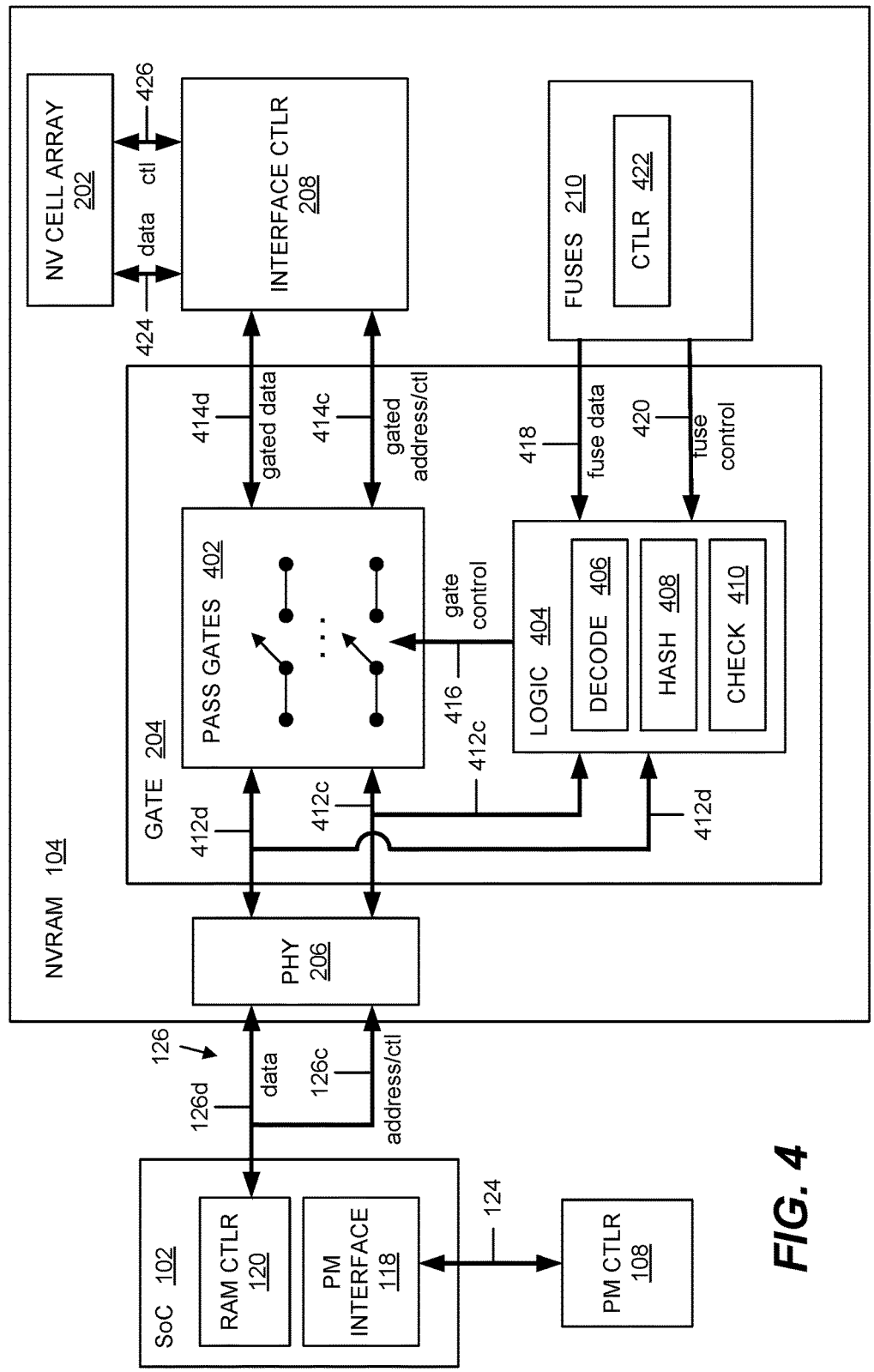
FIG. 4 is a block diagram illustrating an exemplary implementation of the pass gate in the NVRAM of FIGS. 1 and 2.

It should be appreciated that the gate mechanism 204 in NVRAM 104 may be implemented in various ways to accommodate, for example, cost, complexity, performance, level of security, etc. FIG. 4 illustrates a circuit diagram of an exemplary implementation of a gate mechanism 204 configured to provide a cost-effective, mass-producible NVRAM device. In this embodiment, the gate mechanism 204 comprises one or more pass gates 402 and control logic 404. One of ordinary skill in the art will appreciate the design advantages of implementing the gate mechanism 204 with relatively uncomplicated circuits and logic with minimal memory die area without the use of a more complicated microcontroller.

As illustrated in FIG. 4, the pass gates 402 may comprise one or more in-line switches that connect/disconnect the physical layer 206 to an interface controller 208 that provides access to NV cell array 202. As mentioned above, the physical layer 206 provides the connections associated with high-speed bus 126. Connections 126d correspond to data signals, and connections 126c correspond to address/control signals. The physical layer 206 provides the data signals associated with connections 126d to the pass gates 402 and the control logic 404 via connections 412d. The physical layer 206 provides the address/control signals associated with connections 126d to the pass gates 402 and the control logic 404 via connections 412c.

As further illustrated in FIG. 4, each pass gate 402 comprises a first contact and a second contact. The first contact is electrically coupled to the corresponding data connection(s) 412d and address/control connections 412c, and the second contact on the other side of the gate or switch is electrically coupled to corresponding gated data connection(s) 414d and gated address/control connections 414c. The control logic 404 is electrically coupled to each pass gate 402 via connection(s) 416 through which gate control signals may be provided to open and close the individual switches. In this regard, the "locked state" corresponds to the operational state in which the pass gates 402 are opened to prevent access to gated connections 414d and 414c.

Other embodiments of the pass gate 402 function may include a bidirectional transceiver with an output enable controlled by the gate control 416, a bidirectional transceiver that may be powered on/off via a power rail under the control of the gate control 416, or a bidirectional latch/register that may have either output enable or power rail under the control of the gate control 416. The circuits employed may be purposefully designed for bidirectional signaling, or may consist of two separate circuits for handling each (forward and reverse) direction corresponding to write and read data traffic.

As mentioned above, when the device is powered down, the control logic 404 may receive a corresponding command from the power manager controller 108 and, in response, send a "lock" gate control signal via connection(s) 416 to the pass gates 402. It should be appreciated that the gate control signals may comprise individual signals (e.g., one gate control wire for one pass gate) or a single signal (e.g., one gate control for all of the pass gates). In other embodiments, the pass gates 402 may be replaced by a power switch that powers-up or powers-down the interface controller 208 to NV cell array 202. In response to the "lock" gate control signal, the pass gates 402 are opened to prevent access to gated connections 414d and 414c. In this manner, when the device is booted, the gate mechanism 204 is in the "locked state" with the pass gates 402 in the open position to initially prevent read/write operations from accessing NV cell array 202.

When system 100 is booted up and the trusted boot program 130 begins executing on the CPU 102, the unlock password stored in fuse(s) 132 on the SoC 102 may be fetched and provided to physical layer 206, as described above. The control logic 404 fetches the pass gate value provisioned in fuse(s) 210 via, for example, a fuse data bus 418 and a fuse control bus 420. As illustrated in FIG. 4, the fuse(s) 210 may comprise a controller 422 to facilitate communication with the control logic 404. The control logic 404 compares the pass gate value to the unlock password received from the SoC 102. If the unlock password matches the pass gate value, the control logic 404 sends an "unlock" gate control signal to the pass gates 402 via connection(s) 416. In response to the "unlock" gate control signal, the pass gates 402 are closed, thereby connecting data connection(s) 412d and address/control connections 412c to gated connection(s) 414d and gated address/control connections 414c, respectively. In this "unlocked state", the gate mechanism 204 provides unrestricted access to NV cell array 210 via data bus 424 and control bus 426.

As mentioned above, the password exchange between the SoC 102 and the gated NVRAM 104 may be implemented in various ways. In one embodiment, a simple unencrypted password exchange may be implemented via fuse(s) 132 and 210. In other embodiments, the secure password exchange may employ any desirable encryption algorithm(s) to improve the level of security. As illustrated in FIG. 4, when the secure password exchange employs encryption, the control logic 404 may comprise logic modules to support a decode function (block 406), a hash function (block 408), and a check function (block 410).

Decode logic 406 receives control and address via bus 412c, and data via bus 412d. In an embodiment, a predetermined and/or standardized protocol may be implemented for controlling the gate logic block 404, exchanging information such as keys and passwords, or the initialization and programming of elements such as fuses 210. For example, there may be a specific command on the control and address bus 412d that is decoded in block 406 and can then initiate the specific command function. In other embodiments, there may be a unique command and data associated for each type of function (e.g., reset gate logic, program fuse data (multiple locations), program private key, program password, program self-destruct failed tries, enable tamper mechanism, input key modulus p, input key base g, retrieve hash, unlock unencrypted password, unlock encrypted password, etc.).

Decode logic 406 may be responsible for parsing and triggering the appropriate operations in response to the incoming control, address, and data. As further illustrated in FIG. 4, the control and address 412c and data 412d also arrive at pass gates 402 and, if unlocked, propagate to interface controller 208 where it will perform similar predetermined and/or standardized mission-mode operations such as NV cell array read, NV cell array write, NV cell array page select, NV cell array repair, NVRAM device configuration, PHY advanced configuration, and any other functionality that is unrelated to tamper-proofing functions.

A hash function 408 performs modulo arithmetic operations for a secret key exchanging procedure and may include lookup tables and also modulo addition sequential and parallel computation logic. A check function 410 comprises the control logic for comparing the password sent from the SoC 102 against a local copy previously programmed into local NVRAM fuses 210. Decryption logic (not shown) may be included within check function 410 because the SoC 102 may choose to send the password using encryption to prevent a snooper from viewing the password as it travels via external bus 126. If the SoC 102 has encrypted the password, then the decryption logic will first decrypt the password using a shared secret key derived during a secure exchange process such as the Diffie-Hellman method.

FIG. 5 illustrates an exemplary embodiment for unlocking gate mechanism 204 using a Diffie-Hillman password exchange between the SoC 102 and NVRAM 104. Each row in table 500 represents a corresponding step in the password exchange method. The operation of each step is listed in column 530. Column 532 lists information that is "known" by the SoC 102. Column 534 lists information that is "not known" by the SoC 102. Column 536 lists information that is "known" by NVRAM 104. Column 538 lists information that is "not known" by NVRAM 104. Column 540 lists information that may be susceptible to capture by a malicious "snooper". Column 542 lists information that is not susceptible to capture by the malicious "snooper", exemplifying the security provided via the Diffie-Hillman password exchange.

At steps 502 and 504, the SoC 102 sends changeable public keys "g" and "p" over NVRAM bus 126. At step 506, the SoC 102 and NVRAM 104 retrieve a fixed private key, which may be programmed into the fuses 132 and 210, respectively. At steps 508, 510, and 512, the private and public keys locally generate a hash, which is exchanged. The SoC 102 transmits its hash "A" to NVRAM 104 and also reads back the NVRAM's hash "B". At steps 514 and 516, using the hash, public keys, and their respective private key, the SoC 102 and NVRAM 104 separately compute the secret shared key. Without having any access to "a" or "b", the snooper cannot compute "s". At step 518, using this secret key "s", the SoC 102 encrypts and sends a password that was previously stored in NVRAM fuses 210. At steps 520 and 522, NVRAM 104 receives the password message, decrypts it with the secret key "s", and if it matches the previously stored password then gate mechanism 204 is opened, in the manner described above.

As mentioned above, the gate mechanism 204 in NVRAM 104 may be configured in various alternative ways to accommodate, for example, cost, complexity, performance, level of security, etc. In one embodiment, the gate mechanism 204 may be configured, as follows, to provide a cost-effective design while providing a practically reasonable level of security protection. The control logic 402 may include a self-destruct counter configured to permanently lock the gate mechanism 204 after a predetermined number of unsuccessful password exchanges. It should be appreciated that the self-destruct counter provides an additional level of security to against brute-force attacks. The fuse(s) 132 and 210 may be simplified in structure and complexity to allow a limited number of permissible values for the public and private key. In this regard, the hash function described above (block 408) may be implemented in a straightforward manner using, for example, a lookup table, linear feedback shift register, or parallel logic. In embodiments with limited public/private key values, a brute force attacker may obtain secret shared keys and attempt the password unlock. However, without knowledge of the password, the chance of a brute force attacker gaining access before the self-destruct counter mechanism permanently disables the device would be extremely low. Furthermore, the password value may be sufficiently long (e.g., any 256-bit value) while using a relatively uncomplicated encryption/decryption implementation (e.g., a stream cipher, a linear feedback shift register, block cipher, other modulo/xor logic, etc.). One of ordinary skill in the art will appreciate that, by keeping each security feature relatively low in complexity, NVRAM 104 may be implemented in cost-effective design with a reasonable level of tamper/snoop resistance. It should be appreciated that, in a simplified configuration, the systems and methods illustrated in FIGS. 3, 4, and 5 may be implemented with a reduced level of complexity and secure protection, for example, by non-programmable hardcoding the password in the NVRAM 104 with the SoC 102 sending the hardcoded password without using encryption.

Figure 6:
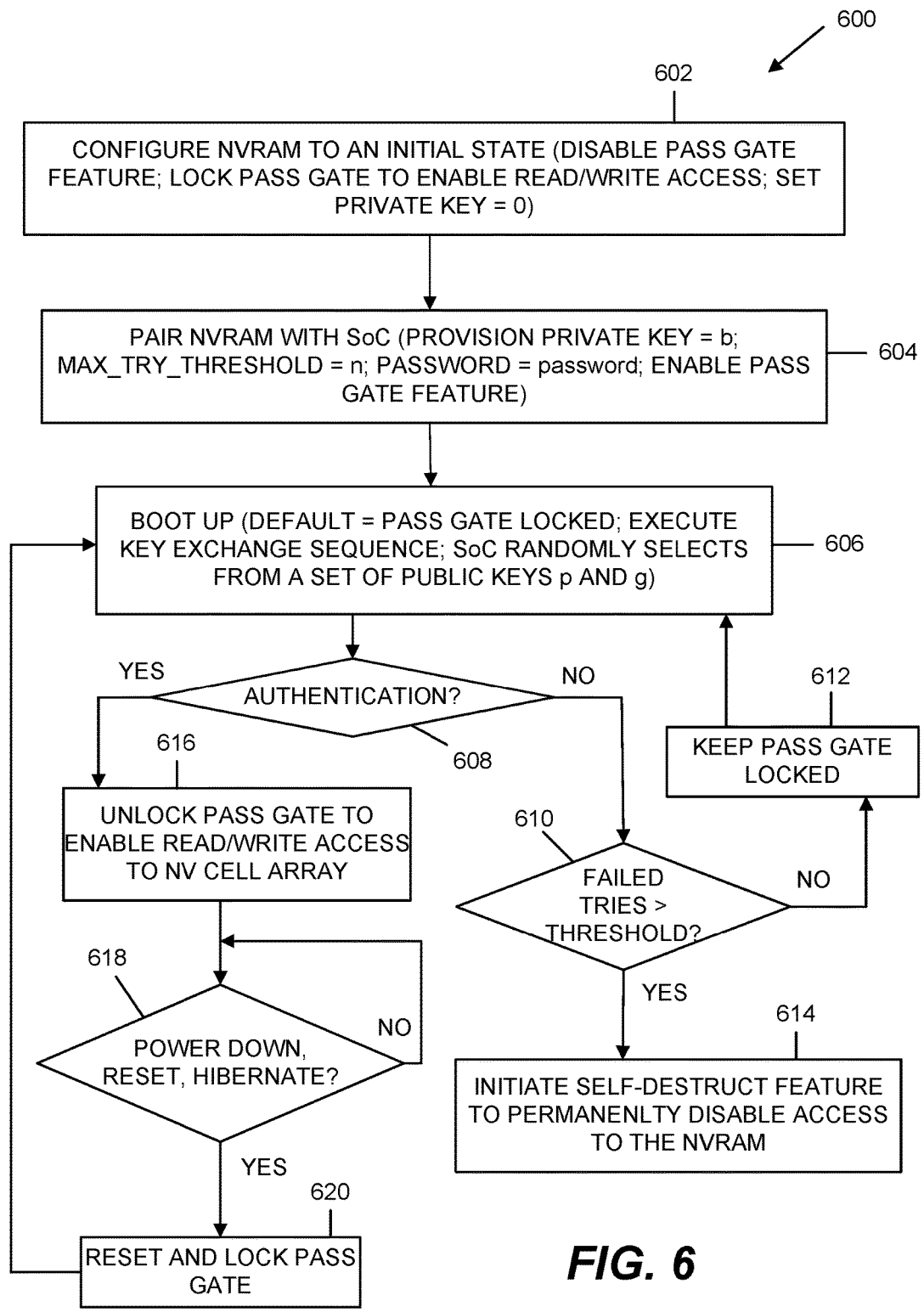
FIG. 6 is a flowchart illustrating an embodiment of a method for initializing the SoC and the NVRAM of FIGS. 1, 2, and 4.

FIG. 6 is a flowchart illustrating an embodiment of a method 600 for initializing a computing device manufactured to incorporate the SoC 102 and the NVRAM 104. At block 602, NVRAM 104 may be configured to an initial state in which the pass gate feature is initially disabled by unlocking the gate mechanism 204 and setting a private=0. At block 604, the NVRAM 104 may be paired with the SoC 102 by provisioning a private key=b, setting the self-destruct counter threshold (MAX_TRY_THRESHOLD)=n, a password="password", and enabling the pass gate feature. At block 606, upon device boot-up, the device is in a default state with the gate mechanism 204 locked. A key exchange sequence may be executed, and the SoC 102 may randomly select from a set of public keys p and g. At decision block 608, NVRAM 104 initiates password authentication. If the password is authenticated, at block 616, the gate mechanism 204 is unlocked to enable read/write access to NV cell array 202. When the device is initiated to be powered down, reset, or enter a hibernate mode (block 618), the gate mechanism 204 is locked (block 620), with process flow returning to block 606. If however, the password is not authenticated (decision block 608), the method 600 may determine (decision block 610) whether the self-destruct failed tries counter has exceeded a threshold (MAX_TRY_THRESHOLD). If the threshold is exceeded, a self-destruct feature many be initiated to permanently disable NVRAM 104. If the threshold is not exceeded, the gate mechanism 204 may be maintained in the "locked state", with process flow returning to block 606 and the failed tries counter being incremented. At block 616 on a successful unlocking, the failed tries counter may be reset. It should also be appreciated that, at block 604, the NVRAM 104 may be paired with the SoC 102 without enabling the pass gate feature. In this manner, the NVRAM 1064 may be used in a legacy mode with an SoC that is not configured to support tamper proof operations. For example, in an embodiment, the SoC 102 may not include fuses 132, or the SoC 102 may not support additional commands to communicate with and control the NVRAM gate logic 404.

Figure 7:
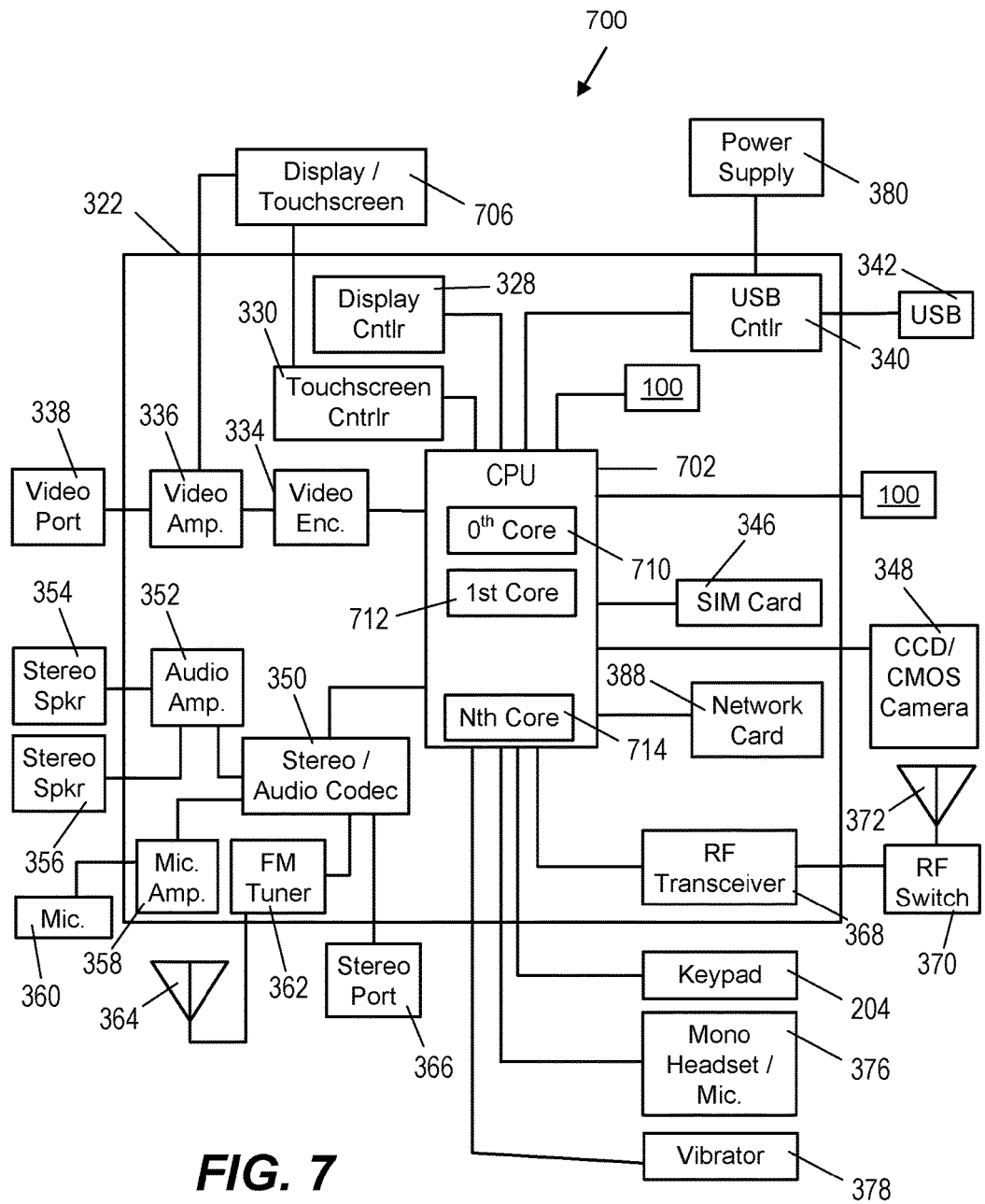
FIG. 7 is a block diagram of an embodiment of a portable computing device for incorporating the system of FIGS. 1, 2, and 4.

As mentioned above, the system 100 may be incorporated into any desirable computing system. FIG. 7 illustrates the system 100 incorporated in an exemplary portable computing device (PCD) 700. It will be readily appreciated that certain components of the system 100 may be included on the SoC 322 (e.g., fuse(s) 132, RAM controller 120, trusted boot program 130) while other components (e.g., NVRAM 104) may be external components coupled to the SoC 322. The SoC 322 may include a multicore CPU 702. The multicore CPU 702 may include a zeroth core 710, a first core 712, and an Nth core 714. One of the cores may comprise, for example, a graphics processing unit (GPU) with one or more of the others comprising the CPU.

A display controller 328 and a touch screen controller 330 may be coupled to the CPU 702. In turn, the touch screen display 706 external to the on-chip system 322 may be coupled to the display controller 328 and the touch screen controller 330.

FIG. 7 further shows that a video encoder 334, e.g., a phase alternating line (PAL) encoder, a sequential color a memoire (SECAM) encoder, or a national television system(s) committee (NTSC) encoder, is coupled to the multicore CPU 702. Further, a video amplifier 336 is coupled to the video encoder 334 and the touch screen display 706. Also, a video port 338 is coupled to the video amplifier 336. As shown in FIG. 7, a universal serial bus (USB) controller 340 is coupled to the multicore CPU 702. Also, a USB port 342 is coupled to the USB controller 340.

Further, as shown in FIG. 7, a digital camera 348 may be coupled to the multicore CPU 702. In an exemplary aspect, the digital camera 348 is a charge-coupled device (CCD) camera or a complementary metal-oxide semiconductor (CMOS) camera.

As further illustrated in FIG. 7, a stereo audio coder-decoder (CODEC) 350 may be coupled to the multicore CPU 702. Moreover, an audio amplifier 352 may coupled to the stereo audio CODEC 350. In an exemplary aspect, a first stereo speaker 354 and a second stereo speaker 356 are coupled to the audio amplifier 352. FIG. 7 shows that a microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 7 further illustrates that a radio frequency (RF) transceiver 368 may be coupled to the multicore CPU 702. An RF switch 370 may be coupled to the RF transceiver 368 and an RF antenna 372. A keypad 204 may be coupled to the multicore CPU 702. Also, a mono headset with a microphone 376 may be coupled to the multicore CPU 702. Further, a vibrator device 378 may be coupled to the multicore CPU 702.

FIG. 7 also shows that a power supply 380 may be coupled to the on-chip system 322. In a particular aspect, the power supply 380 is a direct current (DC) power supply that provides power to the various components of the PCD 600 that require power. Further, in a particular aspect, the power supply is a rechargeable DC battery or a DC power supply that is derived from an alternating current (AC) to DC transformer that is connected to an AC power source.

FIG. 7 further indicates that the PCD 700 may also include a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, a television/cable/satellite tuner, or any other network card well known in the art. Further, the network card 388 may be incorporated into a chip, i.e., the network card 388 may be a full solution in a chip, and may not be a separate network card 388.

As depicted in FIG. 7, the touch screen display 606, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 may be external to the on-chip system 322.

It should be appreciated that one or more of the method steps described herein may be stored in the memory as computer program instructions, such as the modules described above. These instructions may be executed by any suitable processor in combination or in concert with the corresponding module to perform the methods described herein.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, NAND flash, NOR flash, M-RAM, P-RAM, R-RAM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for providing secure access to a non-volatile random access memory, the method comprising:
   in response to a trusted boot program executing on a system on chip (SoC), sending an unlock password from the SoC to a non-volatile random access memory (NVRAM) coupled to the SoC;
   the NVRAM comparing the unlock password to a pass gate value provisioned in the NVRAM; and
   if the unlock password matches the pass gate value unlocking a pass gate within the NVRAM to enable the SoC to access a non-volatile cell array in the NVRAM,
   wherein, when the NVRAM is powered down, the pass gate is configured in a locked state preventing access to the NVRAM.

2. The method of claim 1, wherein the pass gate value is fetched from a programmable memory cell.

3. The method of claim 1, wherein the pass gate value is stored in a NVRAM fuse.

4. The method of claim 1, wherein the pass gate value is hardcoded into a memory device using one or more of a plurality of logic circuits, a read only memory, and metal traces.

5. The method of claim 1, wherein the pass gate comprises one or more switches for electrically coupling a random access memory (RAM) controller residing on the SoC to the non-volatile cell array.

6. The method of claim 1, wherein the unlock password comprises an encrypted message, and the NVRAM comparing the unlock password to the pass gate value provisioned in the NVRAM comprises decrypting an encrypted message comprising the unlock password.

7. The method of claim 1, further comprising:
   if the unlock password does not match the pass gate value, maintain the pass gate in a locked state.

8. The method of claim 1, further comprising:
   maintaining a self-destruct counter to keep track of a number of failed password exchanges between the SoC and the NVRAM; and
   if the self-destruct counter exceeds a threshold, permanently lock the pass gate.

9. A system for providing secure access to a non-volatile random access memory, the method comprising:
   means for sending from a system on chip (SoC) an unlock password to a non-volatile random access memory (NVRAM) coupled to the SoC in response to a trusted boot program executing on the SoC;
   means for comparing the unlock password to a pass gate value provisioned in the NVRAM; and
   means for unlocking a pass gate within the NVRAM if the unlock password matches the pass gate value to enable the SoC to access a non-volatile cell array in the NVRAM,
   wherein, when the NVRAM is powered down, the pass gate is configured in a locked state preventing access to the NVRAM.

10. The system of claim 9, wherein the pass gate value is fetched from a programmable memory cell.

11. The system of claim 9, wherein the pass gate value is stored in a NVRAM fuse.

12. The system of claim 9, wherein the means for unlocking the pass gate comprises one or more switches for electrically coupling a random access memory (RAM) controller residing on the SoC to the non-volatile cell array.

13. The system of claim 9, wherein the unlock password comprises an encrypted message.

14. The system of claim 13, wherein the means for comparing the unlock password to the pass gate value provisioned in the NVRAM comprises:
   means for decrypting the encrypted message comprising the unlock password.

15. The system of claim 9, further comprising:
   means for maintaining the pass gate in a locked state if the unlock password does not match the pass gate value.

16. The system of claim 9, further comprising:
   means for maintaining a self-destruct counter to keep track of a number of failed password exchanges between the SoC and the NVRAM; and
   means for permanently locking the pass gate if the self-destruct counter exceeds a threshold.

17. A non-volatile random access memory device comprising:
   a non-volatile cell array;
   a fuse within the non-volatile random access memory device comprising a pass gate value; and
   a pass gate within the non-volatile random access memory device configured to prevent read/write access to the non-volatile cell array if an unlock password received from a system on chip (SoC) coupled to the non-volatile random access memory device in response to a trusted boot program executing on the SoC does not match the pass gate value, wherein, when the non-volatile random access memory device is powered down, the pass gate is configured in a locked state preventing access to the non-volatile random access memory device.

18. The non-volatile random access memory device of claim 17, further comprising logic configured to:
fetch the pass gate value from the fuse;
compare the received unlock password to the pass gate value; and
send a control signal to the pass gate in response to the comparison of the unlock password to the pass gate value.

19. The non-volatile random access memory device of claim 17, further comprising logic configured to:
maintain a self-destruct counter to keep track of a number of times that the received unlock password does not match the pass gate value; and
if the self-destruct counter exceeds a threshold, permanently lock the pass gate.

20. The non-volatile random access memory device of claim 17, wherein the pass gate is configured to enable read/write access to the non-volatile cell array if the received unlock password matches the pass gate value.

21. The non-volatile random access memory device of claim 17, wherein the fuse comprises a programmable memory cell that stores the pass gate value.

22. The non-volatile random access memory device of claim 17, wherein the pass gate comprises one or more switches electrically coupled to the non-volatile cell array.

23. The non-volatile random access memory device of claim 17, wherein the unlock password comprises an encrypted message, and further comprising logic configured to decrypt the encrypted message.

24. A system for providing secure access to a non-volatile random access memory, the system comprising:
a system on chip (SoC) comprising a random access memory (RAM) controller; and
a non-volatile random access memory (NVRAM) electrically coupled to the RAM controller, the NVRAM comprising:
a non-volatile cell array;
a NVRAM fuse comprising a pass gate value; and
a pass gate configured to prevent read/write access to the non-volatile cell array if an unlock password received from the RAM controller does not match the pass gate value,
wherein, when the NVRAM is powered down, the pass gate is configured in a locked state preventing access to the NVRAM.

25. The system of claim 24, wherein the NVRAM further comprises logic configured to:
fetch the pass gate value from the fuse;
compare the received unlock password to the pass gate value; and
send a control signal to the pass gate in response to the comparison of the unlock password to the pass gate value.

26. The system of claim 25, wherein the NVRAM further comprises logic configured to:
maintain a self-destruct counter to keep track of a number of times that the received unlock password does not match the pass gate value; and
if the self-destruct counter exceeds a threshold, permanently lock the pass gate.

27. The system of claim 26, wherein the pass gate is configured to enable read/write access to the non-volatile cell array if the received unlock password matches the pass gate value.

28. The system of claim 24, wherein the fuse comprises a programmable memory cell that stores the pass gate value.

29. The system of claim 24, further comprising logic configured to:
lock the pass gate in response to one of a device power down and a device hibernation.

30. The system of claim 24, wherein the system on chip is part of a mobile telephone, a personal digital assistant, a pager, a smartphone, a navigation device, or a hand-held computer with a wireless connection or link.

* * * * *